Nov. 14, 1967    V. VARTANIAN    3,353,146
SIGNAL DISPLAY SYSTEM
Filed June 1, 1965    3 Sheets-Sheet 1

INVENTOR
VARTAN VARTANIAN
BY Carole M. Colman
AGENT

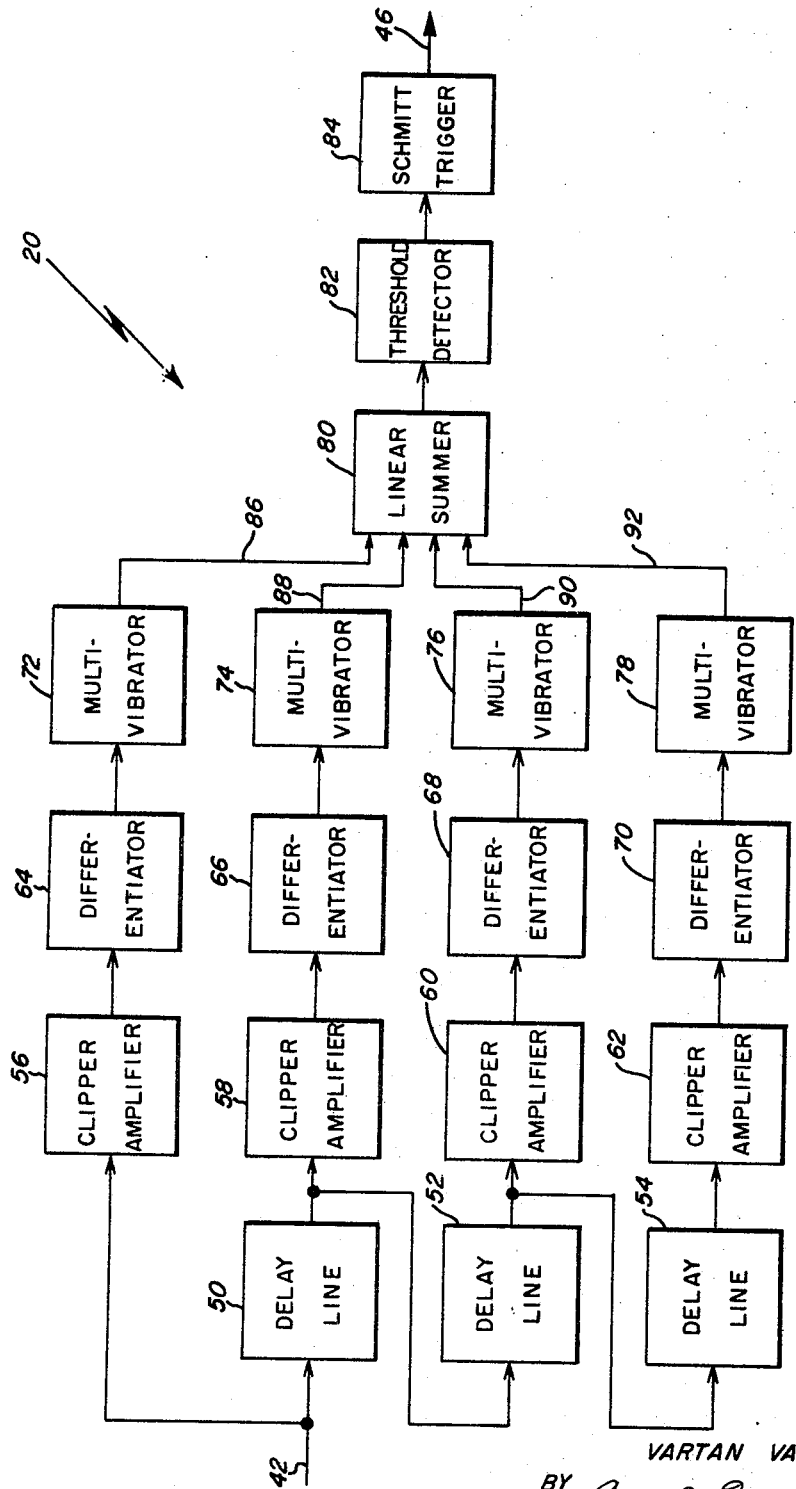

United States Patent Office 3,353,146
Patented Nov. 14, 1967

3,353,146
SIGNAL DISPLAY SYSTEM
Vartan Vartanian, Barrington, R.I., assignor to Raytheon Company, Lexington, Mass., a corporation of Delaware
Filed June 1, 1965, Ser. No. 460,361
14 Claims. (Cl. 340—3)

ABSTRACT OF THE DISCLOSURE

A system for selectively displaying valid signals having a phase coincidence detector for producing zero-crossing signals and a gating signal, an envelope detector for producing an envelope representation of maximum energy, a gate for generating the envelope in response to the gating signal, and a display device for displaying noise-free signals.

---

This invention is concerned with signal display systems and, more particularly, with display systems capable of substantially eliminating the random noise intermingled with valid signals prior to the displaying of said valid signals.

A problem exists particularly in the radar and sonar fields when undesirable random noise is received mixed with valid target signals. This noise is thereupon displayed with the valid signals, causing clutter on the display device and hence the generation of false target reports. This intolerable situation occurs because the displayed noise takes on essentially the same appearance as the true signals so that they are practically indistinguishable. While some systems have been proposed hitherto for reducing this random noise, they have not been truly effective in reducing it to such an extent that it is in effect eliminated.

Accordingly, a primary object of the present invention is to provide an improved means for essentially eliminating the random noise associated with true signals.

A further object is to provide an improved display means which removes the random noise intermingled with valid signals and displays only these valid signals.

Another object of the invention is to provide a noise elimination means which is relatively uncomplicated, inexpensive, and highly reliable.

These and related objects are accomplished in one embodiment of the invention by a sonar display system for a multimode sonar system wherein random noise is substantially reduced by phase coincidence gating of an energy envelope, comprising a frequency converter which receives a plurality of multimode signals from said sonar system and produces a single sonar signal centered at a reference frequency and being mixed with noise, a noise elimination device connected to said frequency converter which effectively removes the random noise associated with the sonar signals, and a PPI display connected to said noise elimination means for displaying the noise-free sonar signals. The noise elimination device includes a phase coincidence detector having delay line, differentiator, and multivibrator means for producing a plurality of selected zero-crossing signals, means for summing said zero-crossing signals, and threshold means responsive to said summed signals for generating a gating signal when this sum is greater than a predetermined level; an envelope detector for producing an envelope representation of the maximum energy generated by the frequency converter; and, a gating means for correlating the zero crossing information against the envelope energy information by generating the envelope in response to the gating signal produced from the zero crossing information.

Other objects, features, applications, and embodiments of the invention will be apparent from the following description of a preferred embodiment and reference to the accompanying drawings, wherein:

FIG. 3 is a block diagram of the phase coincidence detector element of the invention; and, FIG. 4 is a block diagram of the envelope detector element of the invention.

Figure 1:
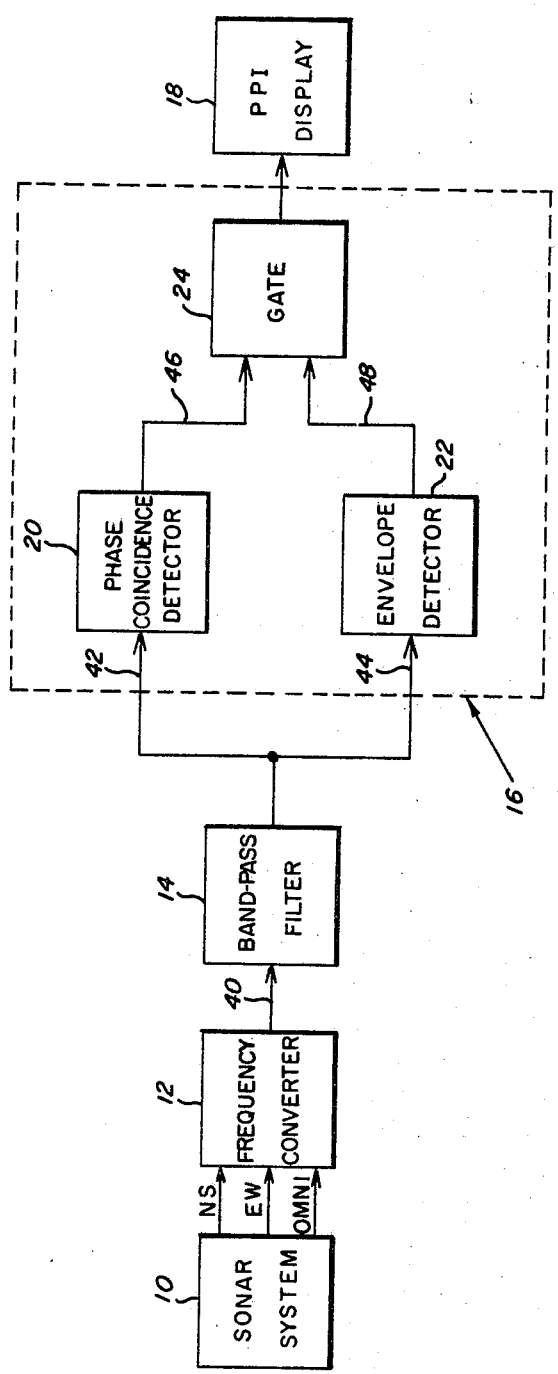
FIG. 1 is a block diagram of a sonar system connected to the inventive sonar display system.

A sonar system 10 is depicted in FIG. 1 as being connected to the display system of this invention which comprises a frequency converter 12, a band-pass filter 14 connected between frequency converter 12 and noise elimination device 16, and a well-known PPI display device 18 connected to noise elimination device 16. Sonar system 10 is by way of illustration a multimode system which produces North-South or NS, East-West or EW, and OMNI signals at its outputs as shown in FIG. 1 and may comprise one of the multimode sonar systems presently available in the sonar art. A particularly suitable system is disclosed in United States Patent No. 3,176,262, issued March 30, 1965, entitled "Directional Sonar Systems," and filed by Stanley L. Ehrlich and Paul D. Frelich, and which is also assigned to the assignee of this application. It is intended that this patent be incorporated herein by reference, and it may be consulted for a detailed description of an applicable sonar system 10, such description being omitted herein so as not to unduly burden this specification.

Figure 2:
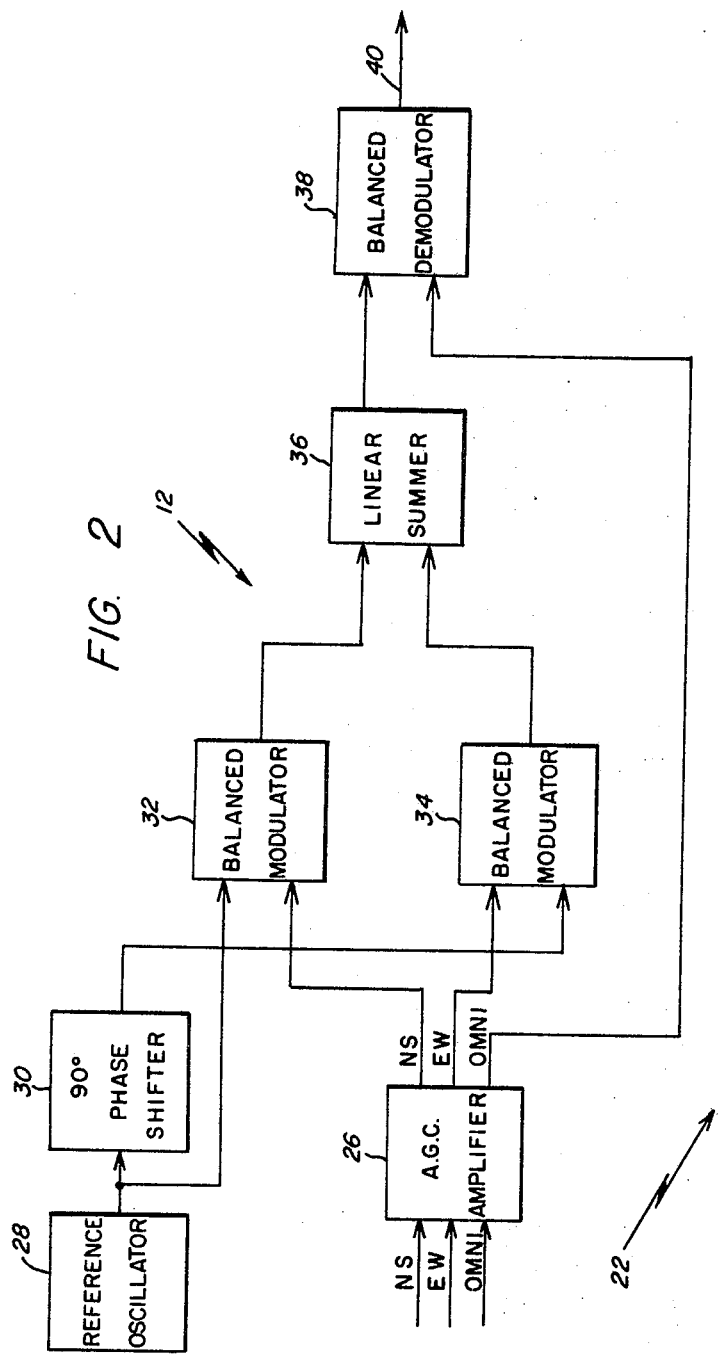
FIG. 2 is a block diagram of the frequency converter element of the invention.

The various elements of frequency converter 12 are shown in FIG. 2 and comprise an A.G.C. amplifier 26 connected to two balanced modulators 32 and 34 and also to balanced demodulator 38, a reference oscillator 28 connected to 90° phase shifter 30 and to balanced modulator 32, with phase shifter 30 also being connected to balanced modulator 34, and a linear summer 36 connected between balanced modulators 32 and 34 and balanced demodulator 38.

The NS, EW, and OMNI signals produced by sonar system 10 are applied to A.G.C. amplifier 26 which may comprise a compressor amplifier for compressing the levels of input noise so that if this noise were displayed on PPI display 18, nearly equal intensity background clutter would appear. One suitable amplifier for implementing A.G.C. amplifier 26 may be found in the record of the International Convention of the Institute of Electrical and Electronics Engineers which took place on March 26, 1963, in an article entitled "A Three-Channel Transistorized A.G.C. Amplifier," by F. J. Wiegand, V. Vartanian, and H. C. Single. It is intended that this article also be incorporated herein by reference and hence may be referred to for a detailed description of a suitable circuit for implementing A.G.C. amplifier 26.

The NS signal from A.G.C. amplifier 26 is applied to balanced modulator 32 which may be of the suppressed carrier type where it is modulated with a signal from reference oscillator 28 so as to convert it to the reference oscillator frequency. In addition, the EW signal is applied to a similar balanced modulator 34 which suppressed carrier modulates it with a signal from 90° phase shifter 30 comprising a two-section RC circuit for instance. This latter signal is actually the signal produced by reference oscillator 28 after being shifted in phase by 90°. The converted frequency output signals from balanced modulators 32 and 34 are then summed linearly in well-known linear summer 36. The summation signal produced by linear summer 36 is applied to balanced demodulator 38 which may be of the suppressed carrier type where it is sum demodulated by the OMNI signal generated by A.G.C. amplifier 26. Accordingly, the output signal produced by balanced demodulator 38 is a reference frequency converted sonar signal mixed with random noise that is generated by sonar system 10 along with the NS, EW, and OMNI signals. Target bearing information is contained in the phase relationship between this output signal and the reference oscillator frequency.

The reference frequency converted sonar signal produced by frequency converter 12 together with accompanying random noise is then applied to band-pass filter 14 of FIG. 1 which may comprise a narrow-band LC filter filter centered at the frequency of reference oscillator 28. This filtering eliminates noise occurring outside of the frequency band within which the multimode sonar signals are known to exist. The output signal from band-pass filter 14 is applied to noise elimination device 16 wherein selected zero-crossings of this signal are processed to provide a gating signal for selectively passing the energy envelope of the band-pass output signal to PPI display 18.

Noise elimination device 16 comprises a phase coincidence detector 20 and envelope detector 22 connected to gate 24. The various elements of phase coincidence detector 20 are depicted in FIG. 3 and include delay lines 50, 52, and 54 connected in series for successively delaying the signal from band-pass filter 14 by equal amounts, clipper amplifiers 56, 58, 60, and 62 for clipper amplifying or squaring their sinusoidal inputs, differentiators 64, 66, 68, and 70 for differentiating the clipper amplified signals, monostable multivibrators 72, 74, 76, and 78 for generating square pulses beginning at the applicable zero-crossings, linear summer 80 for summing the multivibrator square pulses, threshold detector 82 for producing a signal if the sum is above a predetermined level, and Schmitt trigger 84 for shaping the output of threshold detector 82.

The output signal from band-pass filter 14 is applied via line 42 to both clipper amplifier 56 and delay line 50 which may comprise, for example, a well-known LC delay line having a delay whose value is equal to the inverse of the reference oscillator frequency. Delay lines 52 and 54 are identical to delay line 50 in both structure and function. When an input signal is received on line 42, it is passed undelayed to clipper amplifier 56 and delay line 50. After it has been delayed by delay line 50, this signal is applied to both clipper amplifier 58 and to delay line 52 where it is again delayed by the same amount of time. The signal from delay line 52 is transferred to clipper amplifier 60 and delay line 54 for further delaying action before being applied to clipper amplifier 62. Consequently, clipper amplifier 56 receives each signal applied to line 42 undelayed, whereas clipper amplifier 58 receives it after being delayed once, clipper amplifier 60 after being delayed three times. Although three serially connected delay lines have been described herein with reference to the preferred embodiment, it would readily be within the doctrine of equivalents to substitute a tapped delay line therefor.

Clipper amplifiers 56, 58, 60, and 62 are well-known circuits that amplify and shape their sinusoidal input signals such as by combining grid circuit clipping with plate current cutoff clipping, then transferring square waves to differentiators 64, 66, 68, and 70. Each of the latter circuits may comprise, for example, an RC circuit connected to a diode so that only the differentiators spike signals corresponding to the leading edge zero-crossings of the sinusoidal waveform received at the circuit input pass through the diode and are emitted at its output. The midway zero-crossings differentiator spikes are of opposite polarity and hence cannot pass through the diode. The selected initial zero-crossing signals from differentiators 64, 66, 68, and 70 are then applied to monostable multivibrators 72, 74, 76, and 78, respectively, which may comprise for instance any of the well-known one-shot multivibrators for generating square pulses in response to input signals.

The outputs from multivibrators 72, 74, 76 and 78 are all summed in linear summer 80 which may include a single transistor amplifier with a summing resistor matrix at its input. The resultant summation signal from this summing action is then applied to threshold detector 82 comprising a comparator circuit which emits a signal only if the summation value is above a preselected level. This level is determined after considering the input noise level and allowable false alarm rate desired for the system and is based upon the required number of coincident signals from multivibrators 72, 74, 76, and 78 for producing a gating signal. In this embodiment it may be any number from one to four. The threshold detector output signal is applied to well-known Schmitt trigger 84 where it is shaped prior to being applied to gate 24 of FIG. 1 via line 46 as a gating signal.

Figure 4:
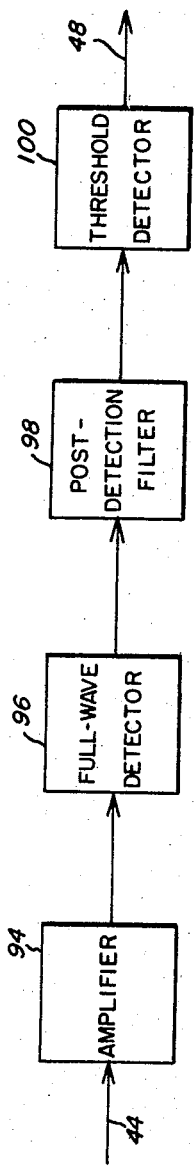

Envelope detector 22 of FIG. 1 is shown in detail in FIG. 4 and comprises an amplifier 94, connected to a full-wave detector 96, and a post-detection filter 98 connected between full-wave detector 96 and threshold detector 100. The signals from bandpass filter 14 of FIG. 1 are transferred via line 44 to amplifier 94 of FIG. 4 which may be any type of the well-known amplifiers available in the art for amplifying the input sonar signal. The signal output of amplifier 94 is then applied to full-wave detector 96 which may be any of the well-known types such as a diode detector that essentially produces the envelope or energy maximum of its input signal and passes this envelope to post-detection filter 98, which may include an RC circuit, for filtering the envelope ripple prior to its being applied to threshold detector 100. The latter circuit 100 produces only that part of its input envelope which is greater than a preselected level and transfers it via line 48 to gate 24 of FIG. 1.

Gate 24 may comprise any type of ON-OFF gate such as a two transistor gate circuit for instance. When a gating signal is received from phase coincidence detector 20 via line 46, gate 24 is operative thus passing the envelope received on line 48 from envelope detector 22 to PPI display 18, which may comprise a cathode ray tube device, where it is applied to the brightening amplifier therein (not shown) and accordingly provides the display brightening signal. Consequently, the essential sonar information is displayed with a minimum of the random noise which causes clutter and tends to produce false target alarms.

It should be appreciated that the invention is not limited to the specific embodiment disclosed herein since it would readily be within the capability of one skilled in the art to make various modifications thereto. For example, although three delay lines have been described herein, it should not be interpreted therefrom that the invention is limited to that number as the optimum number of delays, N, for a particular system depends upon such considerations as bandwidth and signal-to-noise ratio. In addition, if these delay lines were replaced by a tapped delay line as was suggested herein, a single combination of a clipper amplifier and differentiator could be used at the delay line input, thus eliminating the need for the plurality of such combinations as disclosed. The midway zero crossing signals could be inverted and used. The gate which applies the video sonar signals to the PPI display need not be of the ON-OFF category and hence may be for instance a linear gate multiplier for mixing the zero-crossing information with the envelope information. Furthermore, other types of signal sources could be used such as radar, and also other display devices could be used such as SSI displays. Accordingly, the invention is limited only by the scope of the following claims.

What is claimed is:

1. A noise elimination means for substantially reducing random noise which is mixed with valid signals, comprising:

a first means responsive to said valid signals and noise for producing selected zero-crossing signals therefrom including delaying means for delaying said valid signals and noise by a plurality of times, zero-crossing means connected to said delaying means for generating said selected zero-crossing signals, and a summation means connected to said zero-crossing means for summing said selected zero-crossing signals;

a second means also responsive to said valid signals and noise for producing an energy envelope therefrom; and a third means connected to said first and second means for correlating said selected zero-crossing signals with said energy envelope.

2. The invention according to claim 1 and wherein:
said second means includes an energy detector connected to a filter for producing said energy envelope.

3. The invention according to claim 1 and wherein:
said third means includes a gate for passing said envelope in response to said gating signal.

4. The invention according to claim 1 and wherein:
said second means includes an energy detector connected to a filter for producing said energy envelope; and
said third means includes a gate for correlating said selected zero-crossing signals with said energy envelope.

5. A noise elimination means for substantially reducing random noise which is mixed with the valid signals, comprising:

phase coincidence detection means including a plurality of delaying means for delaying said valid signals and noise by a plurality of times, a plurality of differentiators connected to said delaying means for producing selected zero-crossing signals, and summing means connected to said differentiators for summing said selected zero-crossing signals;

envelope means responsive to said valid signals and noise for producing an energy envelope therefrom; and means connected to said phase coincidence detection means and said envelope means for correlating said summed zero-crossing signals with said envelope.

6. A noise elimination means for substantially reducing random noise which is mixed with valid signals, comprising:

phase coincidence detection means including a plurality of delaying means for delaying said valid signals and noise by a plurality of times, differentiator means connected to said delaying means for producing selected zero-crossing signals, summing means connected to said differentiator means for summing said selected zero-crossing signals, and threshold detection means connected to said summing means for producing a gating signal when the sum of said selected zero-crossing signals passes a predetermined level;

envelope means responsive to said valid signals and noise for producing an energy envelope therefrom; and, gating means connected to said phase coincidence detection means and said envelope means for passing said envelope in response to said gating signal.

7. A noise elimination means for substantially reducing random noise which is mixed with valid signals, comprising:

phase coincidence detection means including delaying means for delaying said valid signals and noise by N times, $N+1$ differentiators connected to said delaying means for producing selected zero-crossing signals, summing means connected to said differentiators for summing said selected zero-crossing signals, and threshold detection means connected to said summing means for producing a gating signal when the sum of said selected zero-crossing signals passes a predetermined level;

envelope means responsive to said valid signals and noise for producing an energy envelope therefrom; and gating means connected to said phase coincidence detection means and said envelope means for passing said energy envelope only in response to said gating signal.

8. A noise elimination means for substantially reducing random noise which is mixed with valid signals, comprising:

phase coincidence detection means including delaying means for delaying said valid signals and noise by N times, $N+1$ clipping means connected to said delaying means, $N+1$ differentiators connected to said delaying means for producing selected zero-crossing signals, $N+1$ multivibrators connected to said differentiators for shaping said zero-crossing signals, summing means connected to said multivibrators for summing said shaped zero-crossing signals, and threshold detection means connected to said summing means for producing a gating signal when the sum of said shaped zero-crossing signals passes a predetermined level;

envelope means responsive to said valid signals and noise for producing an energy envelope therefrom; and, gating means connected to said phase coincidence detection means and said envelope means for passing said envelope in response to said gating signal.

9. The invention according to claim 8 and wherein:
said envelope means includes detecting means connected to a filtering means for producing said energy envelope.

10. A signal display system responsive to valid signals mixed with noise from a source for displaying said valid signals substantially reduced in noise, comprising:

a noise elimination means connected to said source for substantially reducing said noise and including phase coincidence detection means comprising delaying means for delaying said valid signals and noise by a plurality of times, differentiator means connected to said delaying means for producing selected zero-crossing signals, and summing means connected to said differentiator means for summing said selected zero-crossing signals, envelope means responsive to said valid signals and noise for producing an energy envelope thereof, and means connected to said phase coincidence detection means and said envelope means for correlating said summed zero-crossing signals with said energy envelope; and, a display device connected to said noise elimination means for displaying said valid signals substantially reduced in noise.

11. A signal display system responsive to valid signals mixed with noise from a source for displaying said valid signals substantially reduced in noise, comprising:

a noise elimination means connected to said source for substantially reducing said noise and including phase coincidence detection means comprising delaying means for delaying said valid signals and noise by a plurality of different times, differentiator means connected to said delaying means for producing selected zero-crossing signals, summing means connected to said differentiator means for summing said selected zero-crossing signals, and threshold means connected to said summing means for producing a gating signal when said summed zero-crossing signals passes a predetermined level, envelope means responsive to said valid signals and noise for producing an energy envelope thereof, and gating means connected to said phase coincidence detection means and said envelope means for passing said envelope only in response to said gating signal; and, a display device connected to said noise elimination means for displaying said valid signals substantially reduced in noise.

12. A signal display system responsive to valid signals mixed with noise from a source for displaying said valid signals substantially reduced in noise, comprising:

a noise elimination means connected to said source for substantially reducing said noise and including phase coincidence detection means comprising delaying means for delaying said valid signals and noise by a plurality of different times, circuit means connected to said delaying means and including at least one clipping means connected to at least one differentiator means for producing selected zero-crossing signals, and summing means connected to said delaying means for suming said selected zero-crossing signals, envelope means responsive to said valid signals and noise for producing an energy envelope thereof, and means connected to said phase coincidence detection means and said envelope means for correlating said summed zero-crossing signals with said energy envelope; and, a display device connected to said noise elimination means for displaying said valid signals substantially reduced in noise.

13. A signal display system responsive to valid signals mixed with noise from a source for displaying said valid signals substantially reduced in noise, comprising:

frequency conversion means connected to said source including an oscillator for producing a reference signal, phase shifting means connected to said oscillator for shifting said reference signal, a first modulating means connected to said oscillator and to said source for modulating some of said source signals with said reference signal, a second modulating means connected to said phase shifting means and to said source for modulating some of said source signals with said shifted reference signal, summing means connected to said first and second modulating means for producing a summed signal, and demodulator means connected to said summing means and to said source for demodulating said summed signal with at least one of said source signals to produce a demodulated signal;

a noise elimination means connected to said frequency conversion means for producing valid signals which are substantially reduced in noise including phase coincidence detection means comprising delaying means connected to said demodulator means for delaying said demodulated signal by N times, $N+1$ differentiators connected to said delaying means for producing selected zero-crossing signals, summing means connected to said differentiators for summing said selected zero-crossing signals, and threshold detection means connected to said summing means for producing a gating signal when the sum of said zero-crossing signals passes a predetermined level, envelope means connected to said demodulator means for producing a signal energy envelope, and gating means connected to said phase coincidence detection means and said envelope means for passing said envelope in response to said gating signal; and, a display device connected to said noise elimination means for displaying signals substantially reduced in noise.

14. A signal display system responsive to North-South, East-West, and OMNI multimode signals mixed with random noise from a sonar source for displaying sonar signals substantially reduced in noise, comprising:

frequency conversion means connected to said sonar source including an oscillator for producing a reference signal, 90° phase shifting means connected to said oscillator for phase shifting said reference signal, a first suppressed carrier modulating means connected to said oscillator and to said sonar source for modulating said North-South multimode signals with said reference signal, a second suppressed carrier modulating means connected to said phase shifting means and to said sonar source for modulating said East-West multimode signals with said shifted reference signal, summing means connected to said first and second modulating means for producing summed signals, and sum demodulator means connected to said summing means and to said sonar source for demodulating said summed signals with said OMNI multimode signals to produce a demodulated signal;

a noise elimination means connected to said frequency conversion means for producing valid sonar signals which are substantially reduced in noise including phase coincidence detection means comprising N delay line means for delaying said valid signals and noise by N different time, $N+1$ clipper amplifiers connected to said delay line means, $N+1$ differentiators connected to said clipper amplifiers for producing leading edge selected zero-crossing signals only, $N+1$ one-shot multivibrators connected to said differentiators responsive to said selected zero-crossing signals for producing square pulses, summing means connected to said multivibrators for summing said square pulses, and threshold detection means connected to said summing means for producing a gating signal when the sum of said square pulses is greater than a predetermined level, envelope means responsive to said demodulated signal for producing an energy envelope therefrom and including a full-wave detector connected to a filter, and ON-OFF gating means connected to said phase coincidence detection means and said envelope means for passing said envelope only in response to said gating signal; and a PPI display device connected to said noise elimination means for displaying sonor signals substantially reduced in noise.

References Cited

UNITED STATES PATENTS

| | | | |
|---|---|---|---|
| 2,605,463 | 7/1952 | Hirschberg et al. | |
| 2,709,218 | 5/1955 | Gabrilovitch. | |
| 2,786,997 | 3/1957 | Chambers. | |
| 2,918,575 | 12/1959 | Porter et al. | 328—165 X |
| 2,982,852 | 5/1961 | Fano. | |
| 2,982,853 | 5/1961 | Price et al. | |
| 2,989,583 | 6/1961 | Thompson. | |
| 3,081,414 | 3/1963 | Goodman. | |
| 3,126,449 | 3/1964 | Shirman. | |
| 3,196,354 | 7/1965 | Engelbrecht | 325—473 X |
| 3,207,988 | 9/1965 | Gerardin | 343—17.1 X |
| 3,296,581 | 1/1967 | Warner | 340—3 |

RODNEY D. BENNETT, *Primary Examiner.*

RICHARD A. FARLEY, *Examiner.*